Inventor
Willard H. Tanke
by T. Lloyd La Fave
Attorney

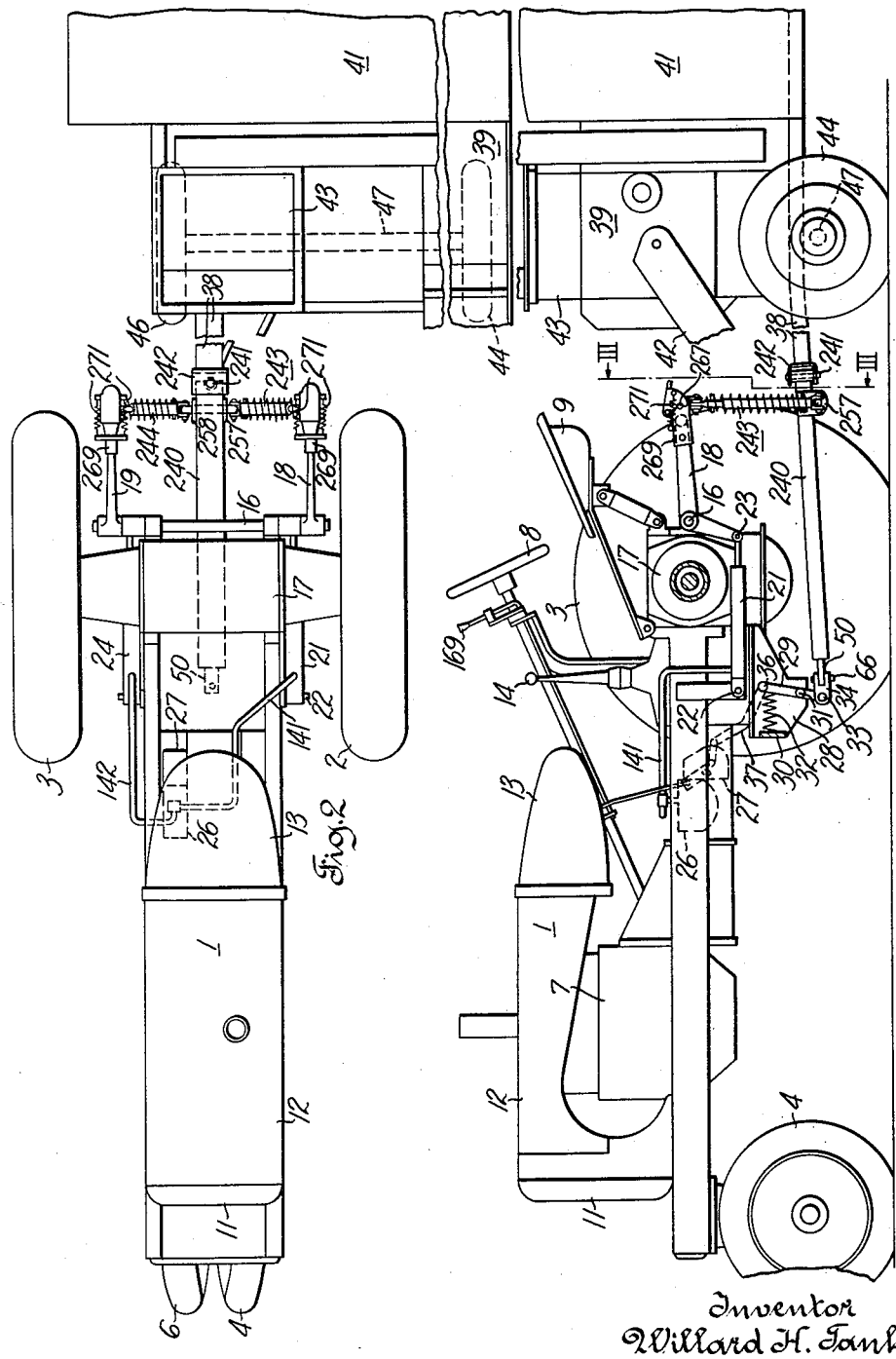

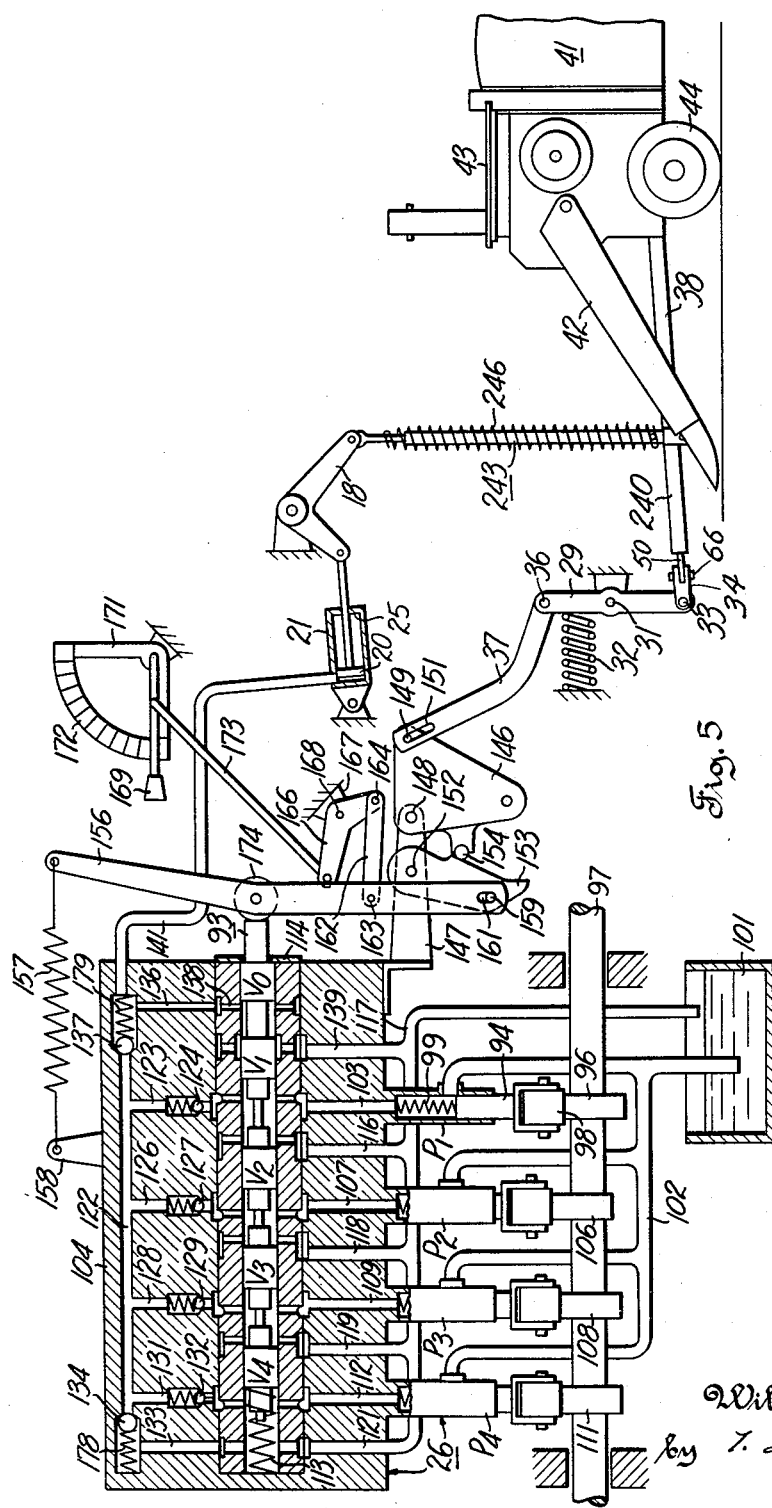

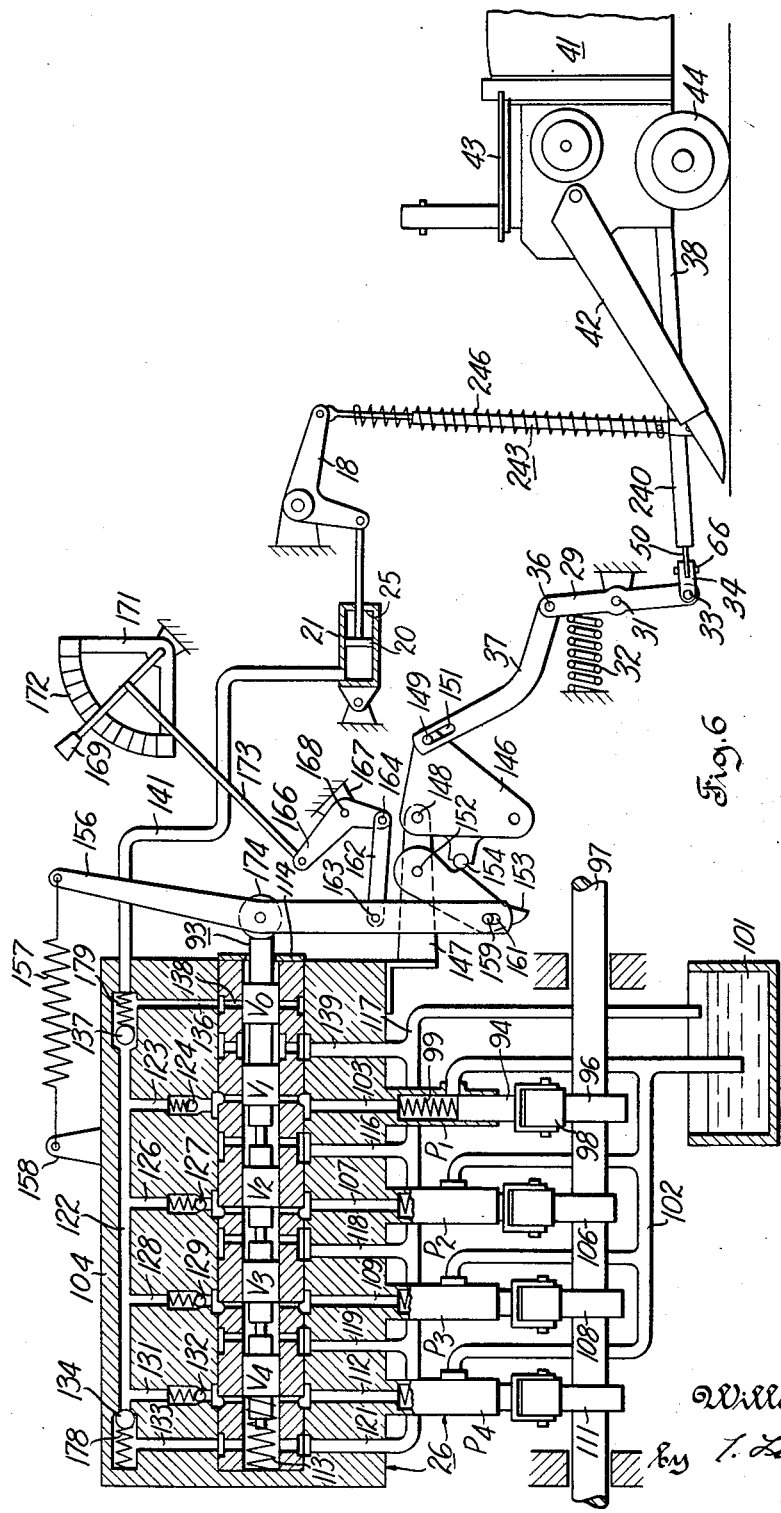

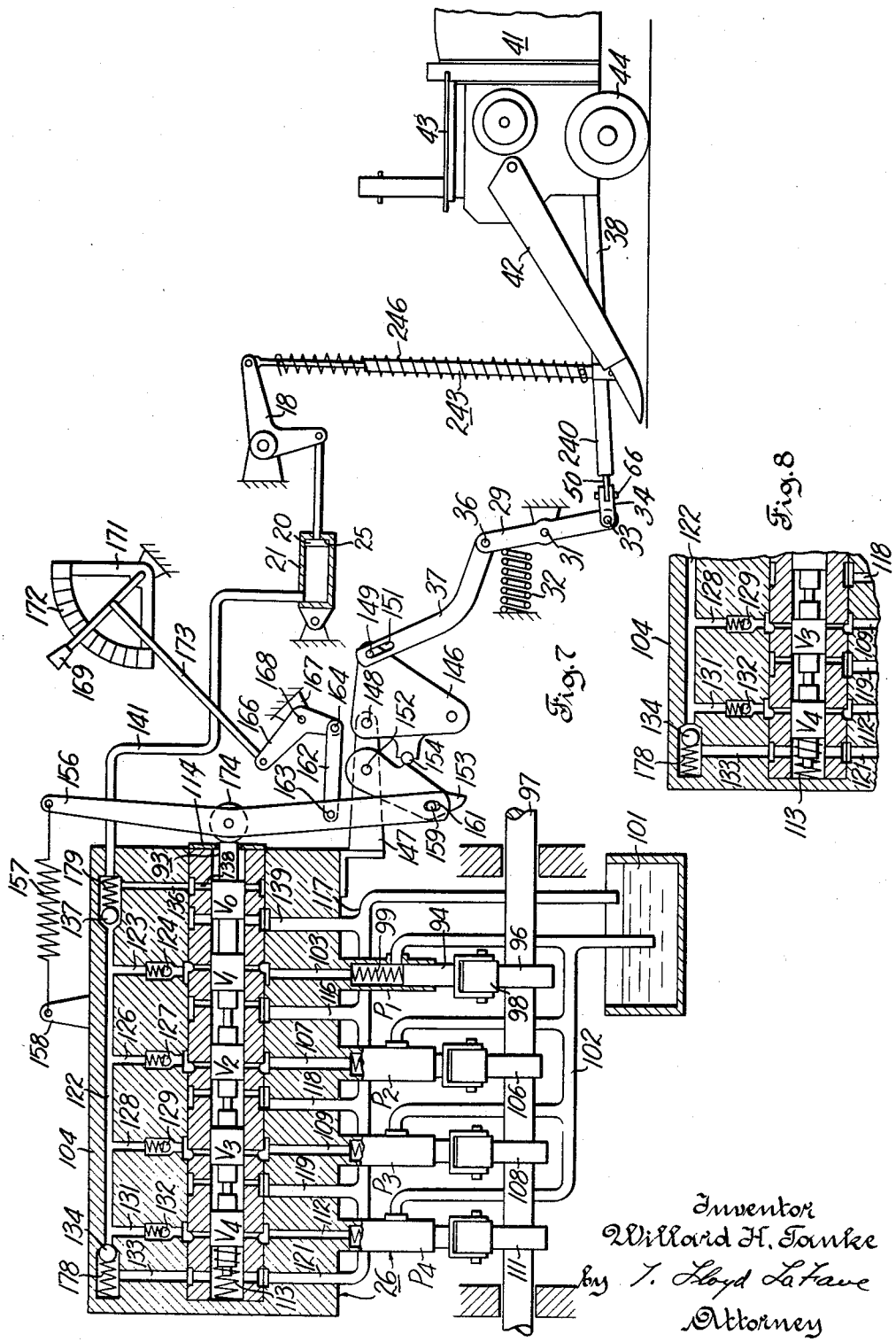

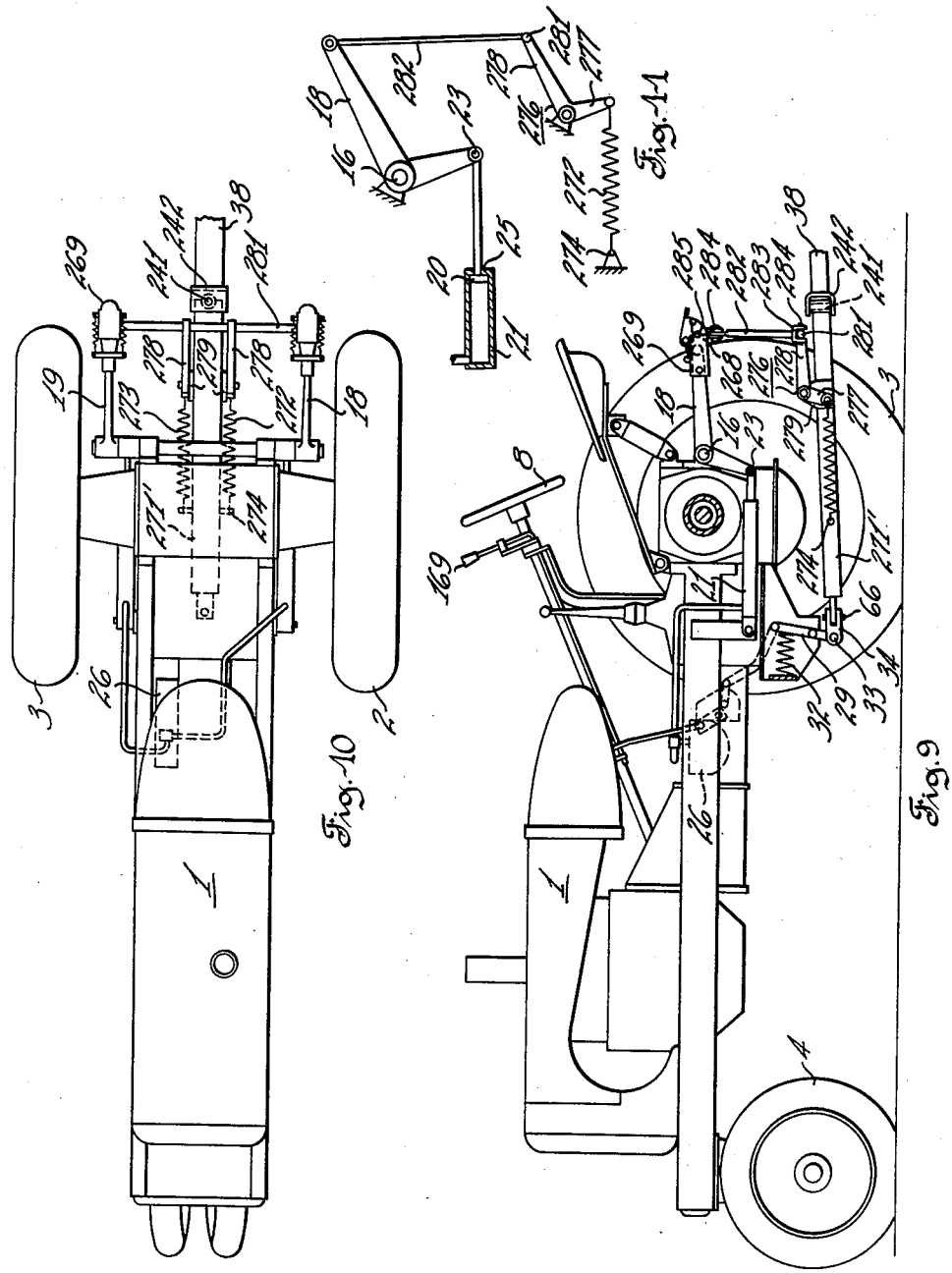

United States Patent Office 2,930,630
Patented Mar. 29, 1960

2,930,630

TRACTOR AND SEMITRAILER COMBINATION WITH WEIGHT TRANSFER MECHANISM

Willard H. Tanke, La Crosse, Wis., assignor to Allis-Chalmers Manufacturing Company, Milwaukee, Wis.

Application June 20, 1956, Serial No. 592,616

4 Claims. (Cl. 280—406)

This invention relates to tractors and more particularly to an improved system for transferring weight from a trailing implement to the drive wheels of the tractor for boosting the traction of the tractor in accordance with its draft requirements.

The type of draft responsive weight transfer system disclosed by W. F. Strehlow in United States Patent 2,679,199, issued May 25, 1954, has been used extensively in connection with agricultural implements such as plows, harrows and the like which are light enough to be entirely picked up by a power lift mechanism of the tractor. This weight transfer system, however, does not lend itself to trail behind implements that are too heavy to be picked up by the tractor.

Nevertheless, it is desired to have a transfer of weight from a trail behind implement that is self-supporting to the rear wheels of a tractor to improve the traction of the rear wheels in response to increases in the draft requirements of the tractor in order to fully utilize the horsepower capacity of a powerful but relatively light tractor. The draft requirements of the tractor will increase, for example, when pulling a trail behind implement such as a combine harvester in a harvesting operation for the harvester becomes heavier as it fills with harvested material.

It is an object of the present invention to provide an improved system for transferring weight from a trail behind implement to the rear wheels of a tractor.

Another object of the invention is to provide an improved means for limiting the weight to be transferred from a trail behind implement to a tractor.

Another object of the invention is to provide a resilient member in a weight transfer system for a tractor and trailing implement that absorbs all of the movement of the lift mechanism and transfers only a predetermined maximum weight from the implement to the tractor.

The foregoing and other objects and advantages are attained by the present invention, various novel features of which will be apparent from the description herein and the accompanying drawings disclosing an embodiment of the invention, and will be more particularly pointed out in the appended claims.

Referring to the drawings:

Fig. 1 is a side view of a tractor and of a semitrail type combine harvester hitched to the tractor, the near rear wheel of the tractor being omitted for purposes of exposure and the rear part of the harvester being likewise omitted;

Fig. 2 is a top view of the tractor and harvester shown in Fig. 1, portions of the harvester being broken away for purposes of simplification;

Figs. 5 through 7 are diagrammatic views of a system incorporated in the tractor and harvester combination shown in Figs. 1, 2 and 3, for transferring weight from the harvester to the tractor;

Fig. 8 is a diagrammatic view of a portion of the pump mechanism of Fig. 7 and showing the release valve in open position;

Fig. 9 is a side view of a tractor and of a modification of a hitch portion of a semitrail type implement, the near rear wheel of the tractor being omitted for better showing the hitch and power lift structure;

Fig. 10 is a top view of the tractor and implement hitch portion shown in Fig. 9; and Fig. 11 is a schematic view illustrating the relative positions of the lift linkage when the hydraulic ram of the power lift of Fig. 9 is fully extended.

Figure 3:
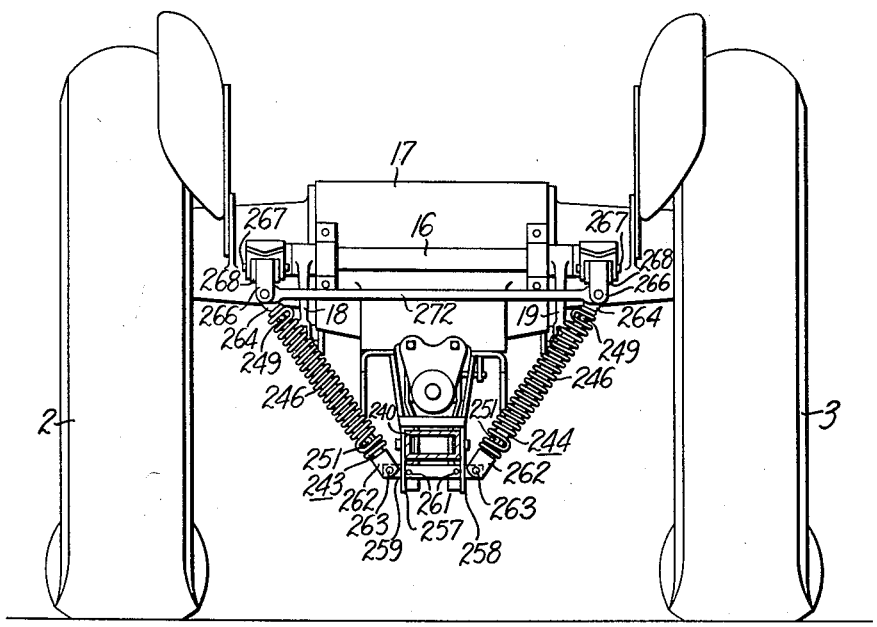
Fig. 3 is an end view of the tractor and hitch portion taken along the line III—III of Fig. 1.

The tractor shown in Fig. 1 is of generally conventional construction in that it comprises a main body generally designated by the reference character 1, a pair of widely spaced rear traction wheels 2 and 3 (Fig. 2) and a pair of narrowly spaced front wheels 4 and 6.

An internal combustion engine 7 at a forward portion of the tractor furnishes power for driving the rear traction wheels 2 and 3, and a clutch, change speed transmission, differential gearing and final drive gears are provided in conformity with established practice to transmit power from the engine to the tractor drive wheels. The front wheels 4 and 6 are steerably mounted at the front end of the tractor main body 1 in conventional manner and a steering wheel 8 in front of an operator's seat 9, serves to adjust the front wheels 4 and 6 for steering purposes as desired. A radiator unit 11, hood 12, fuel tank 13 and gear shift lever 14 are arranged in their usual locations on the tractor main body.

The tractor shown in Figs. 1 and 2 is equipped with a draft responsive power lift mechanism of a type which has heretofore been used in connection with farm tractors, and the details of which are disclosed, for instance, in the hereinbefore mentioned U.S. Patent 2,679,199. Briefly, the power lift mechanism comprises a rock shaft 16 which is mounted on the rear axle housing 17 of the tractor for rotation on a horizontal, transversely extending axis and which is equipped at its opposite ends with a power arm in the form of bell crank levers 18 and 19, each having a relatively long rearwardly extending arm for connection in lift force transmitting relation with an implement at the rear of the tractor, and a relatively short downwardly extending arm for connection with a hydraulic ram. The actuating ram for the bell crank lever 18 is designated by the reference character 21 (Figs. 1 and 2) and is mounted at its barrel end on the tractor main body 1 by means of a pivot pin 22. The piston 20 of the ram 21 is pivotally connected with the depending arm of the bell crank lever 18 by means of a pivot pin 23. The actuating ram for the bell crank lever 19 is generally indicated in Fig. 2 by the reference character 24 and the explanations hereinbefore with respect to the mounting of the ram 21 on the tractor and its connection with the bell crank 18 similarly apply to the mounting of the ram 24 on the tractor and its connection with the bell crank 19.

The rams 21 and 24 are connected with a pressure fluid supply system which will be explained more fully hereinbelow in connection with Figs. 5 through 8, and which includes a pump and valve unit generally designated by the reference character 26, and a control mechanism, part of which is enclosed in a housing 27 attached to the pump and valve unit 26.

A hitch mechanism for resiliently connecting a draft load imposing structure in drawn relation with the tractor is arranged at the underside of the tractor main body 1 in proximity to and forwardly of the rear axle housing 17, as best shown in Fig. 1. The hitch mechanism comprises a bracket 28 which is rigidly secured to the tractor main body; a rockable hitch lever 29 which is pivotally mounted on the bracket 28 by means of a pivot pin 31 for back and forth swinging movement on a horizontal transverse axis in vertically fixed relation to the tractor main body; and a strong coil spring 32 which is operatively interposed between the hitch lever 29 and an abutment 30 on the bracket 28 to yieldingly resist forward swinging movement of the lever 29 about the pivot pin 31. Fig. 1 shows the hitch lever 29 in a generally vertical but somewhat rearwardly inclined position, and the lower end of the lever 29, below the pivot pin 31, is suitably constructed for pivotal connection with a coupling member 34. Preferably, the lower end of the hitch lever 29 is bifurcated and has a pair of transversely aligned coupling pin receiving apertures, so that the coupling element 34 may be straddled by the forked lower end of the hitch lever 29 and connected thereto for up and down swinging movement about a vertically fixed pivot center by insertion of a horizontal coupling pin 33 through the aligned apertures of the hitch lever 29 and a registering aperture in the coupling element 34. Pivotally connected to the upper end of the rockable hitch lever 29 by means of a pivot pin 36 is a reach link 37 which extends forwardly and upwardly from the hitch lever 29 and is operatively connected at its upper forward end with an element of the control mechanism enclosed in the housing 27 as will be more fully explained hereinbelow with reference to Figs. 5 through 8.

The combine harvester, as shown in Figs. 1 and 2, is of generally conventional construction in that it comprises a rigid frame assembly 38; a thresher mechanism of conventional construction, not shown, which is enclosed in a housing 39; a separator mechanism of conventional construction, not shown, which is enclosed in a housing 41; a header 42 pivotally mounted on the thresher housing 39; and a grain bin 43 of substantial capacity, as for instance, twenty-five bushels. A pair of ground engaging supporting wheels 44 and 46 are rotatably mounted on the frame assembly 38 by means of an axle 47 in conventional manner. The implement includes a pull bar or draft tongue having a forward portion 240 and a rearward portion shown as part of frame assembly 38. Forward tongue portion 240 has a vertical pivot 241 coupled to a U-shaped clevis 242 on a forward end of the rearward portion of the draft tongue to provide a vertically rigid connection between forward and rearward portions of the tongue, while the connection provides for horizontally swingable movement of the implement relative to the forward portion 240 of the tongue. Forward portion 240 of the tongue, if desired, may be provided as a drawbar on the tractor. The draft tongue or drawbar is supportedly connected at its forward end with the tractor for up and down swinging movement of the entire harvester as a unit about a vertically fixed pivot center, as will be explained more fully hereinbelow. In operation, the harvested material is accumulated in the grain bin 43 and periodically discharged therefrom as is customary in harvesting operations.

An eye is formed on the forward end 50 of the harvester draft tongue for engagement with a rearwardly extending portion of the coupling element 34, and a coupling pin 66 (Fig. 2) may be inserted through a vertical hole in the coupling element 34 and into the eye.

Figure 4:
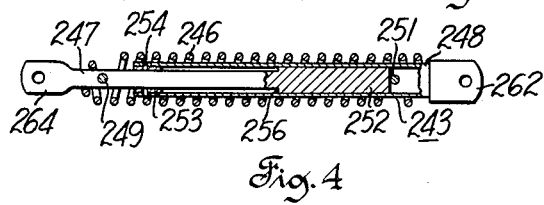
Fig. 4 is an enlarged sectional view of the spring lift transmitting member of the tractor and harvester combination shown in Figs. 1, 2 and 3.

Lift force transmitting means operatively connect the power lift arms 18 and 19 to the draft tongue 240 or pull bar and comprise resiliently yieldable and extensible lift links 243, 244, respectively. As can be seen in Figs. 1, 5, 6 and 8, links 243, 244 are positioned substantially normal to the pull bar. The resiliently yieldable lift links 243 and 244 are alike and each comprises a tension spring 246 mounted on a pair of members 247, 248 slidably engaging each other for relative longitudinal extensible movement. Member 247 is a rod that telescopes with a tubular portion of member 248. Tension spring 246 is a coil spring mounted coaxially of telescoping members 247, 248 with the ends of the spring secured to the remotely spaced end portions of members 247, 248; more specifically, one end of the coil spring is suitably secured as by a pin 249 to the outer end portion of rod member 247 and the other end of the coil spring is similarly secured by a pin 251 to the outer end portion of tubular member 248. In the position shown, Fig. 4, the tension spring 246 holds the members 247, 248 in closed telescoping engagement with pin 251 in member 248 providing a stop for abutting the end portion 252 of rod 247 and limiting further telescoping of the members.

A stop 253 is provided by a ring or insert disposed within the end portion of tubular member 248 through which a reduced shank portion of rod 247 extends. Stop ring 253 may be a split ring that is suitably secured to tubular member 247 as by welding or by pins or set screws 254. The larger diameter end portion 252 of rod 247 serves as a projection having a shoulder 256 for engaging the stop ring 253 upon extension of the telescoping members. Stop 253 limits the extension of the telescoping members and prevents accidentally overstressing the coil springs 246, and separation of the telescoping members.

The lift links 243 and 244 are suitably connected for pivotal movement relative to the drawbar or implement tongue, and the connection as shown comprises a pin receiving bracket structure including plates 257, 258 secured to opposite sides of the drawbar 240 toward the rear portion thereof and forward of the pin 241 coupling the implement tongue portion 38 to the drawbar. A bearing pin 259 extends through the portion of the plates 257, 258 extending below the drawbar. The bearing pin 259 is rotatably supported by the plates and cotter pins 261 extending through bearing pin 259 adjacent opposite faces of the supporting plates secures the bearing pin therein against axial movement. The ends of bearing pin 259 are connected to the lower ends of the lift links 243 and 244. Each tubular member 247 has an end cap 262 welded thereto and forms a forked free end with the ear portions defined thereby having apertures receiving a bolt 263 that extends through the end of the bearing pin disposed in the forked ends. Bearing pin 259 provides a first pivot axis and bolt 263 provides a second pivot axis transverse to the first pivot axis for the lift links 243 and 244, thereby providing a universal pivot connection between the lift links and the drawbar 240.

The end 264 of each lift transmitting link is detachably connected to its power lift arm by a suitable structure comprising a knuckle piece 266 having a latch pin or quick coupling stud 267 which is disposed in jaws 268 of a well known socket structure 269 attached to the lift arm. The socket structure includes a latch member biased by a double acting overcenter spring 271 to hold the latch member in either open or closed position. A rigid cross bar 272 is secured between the upper ends of the lift links, accurately spacing them for ready connection to the lift arms.

The extension of the lift links 243 and 244, under normal operating conditions, is limited by the limit of movement of the pistons in the single acting fluid motors 21, 24 which operate bell crank levers 18 and 19. These bell crank levers may become subject to lifting force at any time during operation of the harvester, as will be explained more fully herein.

Referring to Fig. 5, the pump and valve unit 26, which has been mentioned hereinbefore, comprises four reciprocable plunger pumps $P_1$, $P_2$, $P_3$, and $P_4$, and an axially reciprocable valve spool 93 having lands $V_1$, $V_2$, $V_3$ and $V_4$ for controlling the discharge of the pumps $P_1$, $P_2$, $P_3$ and $P_4$, respectively. The pump $P_1$ has a plunger 94 which is reciprocated back and forth by an eccentric 96 on a rotary shaft 97, the eccentric 96 bearing against a roller 98 at the lower end of the plunger 94 and a coil spring 99 being mounted in the cylinder of the pump $P_1$ to urge the plunger 94 toward the shaft 97 and thereby maintain the roller 98 in engagement with the eccentric 96. The shaft 97 forms part of the power transmitting mechanism between the engine 7 and the tractor rear wheels 2 and 3, and the arrangement is such that the shaft 97 rotates when the engine 7 is running and the master clutch of the tractor is engaged. The pump $P_1$ draws liquid, preferably oil, from a sump 101 through a branch of an inlet manifold 102 and discharges it into a passage 103 of the housing 104 for the valve spool 93. The usual check valves, not shown, are associated with the intake and outlet ports of the pump $P_1$ so that operation of the latter will continuously feed oil into the passage 103.

The foregoing explanation with respect to the pump $P_1$ similarly applies to each of the pumps $P_2$, $P_3$ and $P_4$. That is, the pump $P_2$ is operated by an eccentric 106 on shaft 97 and feeds oil into a passage 107; the pump $P_3$ is operated by an eccentric 108 on shaft 97 and feeds oil into a passage 109, and the pump $P_4$ is operated by an eccentric 111 on shaft 97 and feeds oil into passage 112.

The valve spool 93 is axially slidable back and forth in the housing 104, and a coil spring 113 at the left end of the valve spool 93 reacts between the housing 104 and the valve spool 93 so as to urge the latter toward the limit position in which it is shown in Fig. 5 and which is determined by axial engagement of a land $V_0$ of the valve spool with an end stop 114. End stop 114 is provided by a plate rigid with housing 104 and mounted on the right end of a cylinder for valve spool 93. A reduced end portion of valve spool 93 freely passes through a bore in the end stop 114.

In the position of the valve spool, as shown in Fig. 5, the oil delivered by pump $P_1$ into the passage 103 passes from the latter through the space between the lands $V_1$ and $V_2$ into a branch 116 of the outlet manifold 117 and is returned by the latter to the sump 101. Similarly, the oil delivered by the pump $P_2$ into the passage 107 passes from the latter into the space between the lands $V_2$ and $V_3$ of the valve spool 93 into a branch 118 of the outlet manifold 117 and is returned by the latter to the sump 101. The oil delivered by the pump $P_3$ into the passage 109 passes from the latter into the space between the land $V_3$ and $V_4$ of the valve spool 93 into a branch 119 of the outlet manifold 117 and is returned by the latter to the sump 101. The oil delivered by the pump $P_4$ into the passage 112 passes from the latter into the space between the land $V_4$ and the left end wall of the valve housing 104 into a branch 121 of the outlet manifold 117 and is returned by the latter to the sump 101.

A pressure manifold 122, shown in the upper part of the valve housing 104 in each of Figs. 5, 6, 7 and 8, has a first branch 123 which is controlled by a check valve 124 and communicates, opposite to the passage 103, with the valve chamber enclosing the valve spool 93. A second branch 126 of the pressure manifold 122 is controlled by a check valve 127 and communicates, opposite to the passage 107, with the valve chamber enclosing the valve spool 93. A third branch 128 of the pressure manifold 122 is controlled by a check valve 129 and communicates, opposite to the passage 109, with the valve chamber enclosing the valve spool 93. A fourth branch 131 of the pressure manifold 122 is controlled by a check valve 132 and communicates, opposite the passage 112, with the valve chamber enclosing the valve spool 93. A relief passage 133, which connects the left end of the chamber for valve spool 93 with the pressure manifold 122, is controlled by a check valve 134 which, as will be explained hereinbelow, serves as an unloading valve.

An internal passage 136 of the valve housing 104 at the upper right hand end of the latter, as shown in Fig. 5, has a port controlled by a check valve 137 in communication with the pressure manifold 122, and the internal passage 136 communicates with the right hand end of the chamber for the valve spool 93 through a port 138 which, as will be explained hereinbelow, is controlled by the land $V_0$. In the position of the valve spool 93, as shown in Fig. 5, the space between the lands $V_0$ and $V_1$ is in open communication with a branch 139 of the outlet manifold 117, but when the valve spool is shifted toward the left, as shown in Figs. 6 and 7, the port 138 is closed by the land $V_0$.

A conduit 141 comprises means operatively interconnecting servomotor or ram 21 solely to said control mechanism 26. Conduit 141 connects the internal passage 136 of the valve housing 104 with the ram 21, as indicated diagrammatically in Fig. 5, and as shown more clearly in Figs. 1 and 2. The other ram 24 of the tractor is also connected with the internal passage 136, and a suitable connecting conduit 142 is indicated in Figs. 1 and 2. However, the tractor mounted ram 24 is not shown in the diagrammatic view of Fig. 5 because the rams 21 and 24 are in effect connected in parallel relation with each other, and for practical purposes act as a single fluid motor.

The hitch lever 29 is shown in Fig. 5 in a more forwardly tilted position than in Fig. 1, and the spring 32 is shown in a correspondingly compressed condition in which it strongly but yieldingly opposes further forward swinging movement of the lever 29 about the pivot center 31. The upper end of the lever 29 is pivotally connected with the reach link 37, and the statement has been made hereinbefore that the reach link 37 is operatively connected at its upper forward end with an element of the control mechanism enclosed in the housing 27. The mentioned control mechanism is diagrammatically indicated in Fig. 5 and comprises a generally triangular rocker 146 which is pivotally supported on a stationary bracket 147 by means of a pivot pin 148. The rocker 146 carries a stud 149 which projects into a slot 151 of the reach link 37. The stud 149 and slot 151 form a lost motion connection between the reach link 37 and the triangular rocker 146, and in the condition of the mechanism as shown in Fig. 5, the stud 149 is engaged by the upper end of the slot 151 so that the rocker will be prevented from anticlockwise movement, as viewed in Fig. 5 about the pivot pin 148 as long as the hitch lever 29 is in the indicated position.

Pivotally mounted on the bracket 147 by means of a pivot pin 152 is a secondary rocker 153 which bears at one side against a lug 154 on the triangular rocker 146. The secondary rocker 153 is biased anticlockwise, as viewed in Fig. 5, into engagement with the lug 154 by means of a floating lever 156 and a coil spring 157 which is operatively interposed between the upper end of the floating lever 156 and a bracket portion 158 of the valve housing 104 so as to urge the upper end of the floating lever 156 toward the left in Fig. 5.

The floating lever 156 has a pin and slot connection at its lower end with the secondary rocker 153, a pin 159 being secured to the secondary rocker 153 and extending through a slot 161 in the lower end of the floating lever 156. A hand operated mechanism for moving the floating lever 156 back and forth about its connection with the secondary rocker 153 comprises a link 162 which is pivotally connected at one end to the lever 156 by means of a pivot pin 163 and at its other end by means of a pivot pin 164 to a bell crank lever 166. The bell crank lever 166 is pivotally supported at its fulcrum on a stationary bracket 167 by means of a pivot pin 168 and adjustment of the bell crank lever about the pivot pin 168 may be effected by means of a hand lever 169 shown in the upper part of Fig. 5 and also in proximity to the steering wheel 8 in Fig. 1. The hand lever 169 is pivotally mounted on a suitable support 171 mounted on the steering column of the tractor, the support 171 including quadrant 172 along which the hand lever 169 may be moved to the various positions in which it is shown in Figs. 5, 6 and 7. A suitable detent mechanism, not shown, is provided for releasably retaining the hand lever 169 in any position of adjustment along the quadrant 172. Pivotal movement of the hand lever 169 about its pivot center on the bracket 171 is transmitted to the bell crank lever 166 by means of suitable linkage diagrammatically represented in Fig. 5 by the link 173. Upward adjustment of the hand lever 169 from the position in which it is shown in Fig. 3 causes anticlockwise movement of bell crank lever 166 about its pivot center 168, and corresponding anticlockwise movement of floating lever 156 about pivot pin 159 on secondary rocker 153. The floating lever 156 is arranged in such relation to the reciprocable valve spool 93 that the latter may be moved to the left in opposition to the action of the spring 113 by movement of the floating lever 156 toward the left from the position in which it is shown in Fig. 5, the lever 156 having a suitable contact boss 174 for cooperative engagement with the right end face of the valve spool 93.

The principal purpose of the herein disclosed hydraulic system is to transfer weight from the harvester to the rear wheels of the tractor when such weight transfer becomes desirable in order to keep the tractor moving under severe operating conditions. The principal advantage of the system resides in the fact that it provides for handling of a relatively large and heavy implement by a powerful tractor whose weight to horsepower ratio is relatively small. For example, the tractor may have an engine which is capable of developing 45 horsepower but the operating weight of the tractor may only be about 4700 pounds. Assuming that the general overall construction of the tractor conforms with accepted practice, the normal load carried by the rear wheels 2 and 3 would be about seventy percent of the total tractor weight, that is, about 3300 pounds, and the normal load carried by the front wheels 4 and 6 of the tractor would be about thirty percent of the total tractor weight or about 1400 pounds. On the other hand, the harvester may be assumed to have a total net weight of about 3000 pounds and may carry an additional load of roughly 1000 pounds in the grain bin 43. That is, the weight of the harvester, particularly when the bin is loaded, may be such that the normal vertical load on the tractor rear wheels of about seventy percent of the total tractor weight would be inadequate to afford the necessary grip of the tractor drive wheels for advancing the harvester under the difficult conditions which are frequently encountered in harvester operations.

Another problem presented by the assumed circumstances is the danger of the tractor front end to swing upward about the rear wheel axis of the tractor if an attempt were made to lift the harvester by operation of the tractor mounted rams 21 and 24 without limiting the lift force transmitted.

The provision of the herein disclosed traction boosting system avoids these difficulties, that is, it insures adequate grip of the tractor drive wheels to utilize the full power of the engine for propulsion purposes; and it eliminates the hazard presented by the tractor swinging up rearwardly about the axis of the tractor rear wheels.

Considering first the operating condition of the system illustrated by Fig. 5, it will be noted that the hand lever 169 is adjusted to its extreme downward or implement lowering position, and that the spring 32 is in a state of substantial compression due to the development of considerable draft force by the tractor. Forward swinging of the lever 29 from the position in which it is shown in Fig. 5 to that in which it is shown in Fig. 6 is transmitted to the reach link 37 and, as a result, the triangular rocker 146 will turn in anticlockwise direction to a limited extent about its pivot pin 148 under the bias to which it is subjected by the control spring 157 which tends to swing the floating lever 156 about its pivot center 163 and acts through the pin and slot connection 159, 161 to swing the second rocker 153 and the triangular rocker 146 in anticlockwise direction about their respective pivot pins 152 and 148.

For purposes of explanation it may be assumed that the forward pull which is required to advance the harvester with the spring 32 compressed as shown in Fig. 6, exceeds the drawbar pull which the tractor is able to develop under its normal rear wheel load of about 3300 pounds. That is, if the normal downward load on the rear wheels of the tractor is seventy percent of the total tractor weight, as mentioned hereinbefore, application of the full driving torque of the engine to the tractor rear wheels will cause the tractor wheels to slip and consequently the advance movement of the tractor will slow down or possibly stop altogether. The system, and particularly the coil spring 32, are so designed that when the hand lever 169 is in its fully lowered position as shown in Fig. 5 and the drawbar load reaches the point where the tractor wheels begin to slip, as explained hereinbefore, the floating lever 156 will assume a position approximately as indicated in Fig. 5, that is, a position in which the contact boss 174 is just about ready to engage the right end of the valve spool 93 while the latter is in the limit position in which it is shown in Fig. 5. When the operator notices that the tractor slows down due to wheel slippage he may increase the grip of the tractor rear wheels by simply moving the hand lever 169 upward from its implement lowering to an intermediate or weight transfer position such as indicated, for instance, in Fig. 6.

Comparing Fig. 6 with Fig. 5, it will be noted that upward adjustment of the hand lever 169 from its implement lowering position, while the hitch lever 29 is in a forwardly adjusted position and the spring 32 is appreciably loaded due to heavy drawbar pull of the tractor, causes the floating lever 156 to swing to the left in Fig. 6 about the pivot pin 159 on the secondary rocker 153 so as to move the valve spool 93 to an adjusted position, as illustrated in Fig. 6. In this position the port 138 of the internal passage 136 is closed by the land $V_0$ of the valve spool 93 and the land $V_1$ of the valve spool 93 has moved into a position which prevents the oil discharge from pump $P_1$ from passing into the branch 116 of the outlet manifold 117. Not being able to return to sump, the oil discharged from pump $P_1$ unseats the check valve 124 and builds up pressure in the pressure manifold 122. Continued delivery of oil from pump $P_1$ into the pressure manifold 122 unseats the check valve 137 and causes passage of pressure fluid through the conduits 141 and 142 into the rams 21 and 24 and is effective to impose a traction boosting additional load upon the tractor rear wheels 2 and 3 by means of the bell crank levers 18, 19 which pivot counterclockwise, in Fig. 6, to tension lift link coil springs 246 proportionately to the hydraulic pressure applied to the rams 21, 24. This pressure is termed the traction boosting line pressure of the system, and is built up, under the conditions illustrated by Fig. 6, by the operation of pump $P_1$ and communicated to rams 21 and 24.

As the pressure in the pressure manifold 122 rises, the downward load component which is transmitted to the ground by the harvester wheels 44 and 46 becomes progressively smaller and a correspondingly increasing load becomes effective upon the tractor rear wheels. The downward load which is imposed under these circumstances upon the rearwardly extending arms of the bell crank levers 18 and 19 by the coil springs 246 of the lift links 243 is opposed by the weight component of the tractor which acts downwardly upon the front wheels 4 and 6. In order to preserve proper steering response of the tractor, the front wheels should remain subject to a substantial load at all times, but in actual practice it has been found that a considerable amount of the normal downward load on the front wheels may be transferred to the rear wheels for traction boosting purposes without adversely affecting the steering response of the front wheels. If the normal front wheel loading of the tractor is about 1400 pounds as has been assumed hereinbefore, it would be entirely practical for traction boosting purposes to transfer as much as a total load of 1100 pounds to the tractor rear wheels by operation of the rams 21 and 24, part of this total load being taken from the harvester and another part from the tractor front wheels.

The amount of weight which will be automatically transferred from the tractor front wheels to the tractor rear wheels increases and decreases in accordance with any increase or decrease of the traction boosting line pressure, and the coil springs of the lift links are so chosen that the rams become fully extended when the tension in the springs is effective to transfer the limiting load to the tractor rear wheels. The system thus functions, not to limit the line pressure for controlling traction boosting, but to automatically limit the lift force that the rams can transmit to the lift arms.

While the system is in the condition as illustrated in Figs. 6 and 7, four major downward load components are effective upon the rear wheels of the tractor, namely, first, the normal part of the total tractor weight which, as explained hereinbefore, may approximate seventy percent of the total operating weight of the tractor; second, the weight component originating from that part of the harvester weight which is carried on the hitch lever 29 without traction boosting; third, the weight component transferred from the harvester by the rams 21, 24; and fourth, a portion of the normal front wheel load such as ten percent of the total tractor weight. Thus, with maximum traction boosting the reactive supporting force of the ground on the rear wheels of the tractor may be greater than the weight of the tractor itself.

When the tractor is operated to advance the harvester in the condition as illustrated by Fig. 6, with the hand lever 169 adjusted as shown to a weight transfer position, the drawbar pull of the tractor may increase or decrease as the harvester encounters various conditions of resistance against propulsion. Should the resistance increase, the spring 32 will be further compressed and, as a result the valve spool 93 will be moved further to the left with the result that the pump $P_2$ and possibly pumps $P_3$ and $P_4$ may start delivering pressure fluid into the pressure manifold 122, to the rams 21, 24.

When a condition of excessive draft load is encountered while the hand lever 169 is in the weight transfer or traction boosting position in which it is shown in Fig. 6, the system will function automatically to prevent upward swinging of the tractor and consequent loss of steering response. This is illustrated by Fig. 7. As distinguished from Fig. 6, Fig. 7 shows the main valve spool 93 in its limit position of axial displacement to the left to which it is moved automatically by anticlockwise movement of the floating lever 156 about the pivot pin 163 under the action of the control spring 157, when the hitch lever 29 swings forward against the yielding resistance of the spring 32 under an excessive draft load. In that event all four pumps $P_1$, $P_2$, $P_3$ and $P_4$ will deliver pressure fluid into the pressure fluid manifold 122, and the traction boosting line pressure which acts upon the rams 21 and 24 will quickly attain a sufficiently high value so as to force the rams 21, 24 to the limit position in which it is shown in Fig. 7.

The condition of the system as illustrated by Fig. 7 may be assumed to exist only for limited times, because the draft requirements of the harvester will change continuously during normal operations. Decrease of the draft force which is transmitted from the tractor to the harvester may reach the point where the spring 32 would swing the hitch lever 29 from the forwardly inclined position in which it is shown in Fig. 7 to the rearwardly inclined position in which it is shown in Fig. 1, while the hand lever 169 remains in the traction boosting position in which it is shown in Figs. 6 and 7. As a result of such rearward swinging of the hitch lever 29 the floating lever 156 would be forced to swing about the pivot pin 163 in clockwise direction and in opposition to the action of the control spring 157. Such clockwise swinging of the floating lever would permit the valve spool 93 to assume the position in which it is shown in Fig. 5 and in which the port 138 is uncovered by the land $V_0$, so that any pressure which may have been built up in the rams 21, 24 will be fully released. Such pressure release immediately relieves the tractor rear wheels of the traction boosting load to which they were subjected by the system.

From the foregoing explanations it will be apparent that the system operates automatically to impose a traction boosting additional load on the tractor rear wheels only when needed, and that the tractor rear wheels are automatically relieved of such additional loading when it is no longer required. When the hand lever 169 has been adjusted to a weight transfer position, such as shown for instance in Figs. 6 and 7, and if the lever is then left in that position, the system will operate automatically to transfer more or less weight from the harvester to the tractor as required by changing conditions of draft requirements.

Referring to Figs. 7 and 8, the ball or other closure element of the check valve 134 at the upper left hand corner of said figure is urged upon its seat by a spring 178, and the ball of the check valve 137 is urged upon its seat by a spring 179 which is so proportioned that the check valve 137 opens at a much lower pressure in the manifold 122 than the check valve 134. The purpose of the check valve 137 is to suppress kickback of pressure from the rams into the pumps, and the spring 179 is relatively weak so as to yield readily when fluid pressure builds up in the manifold 122. The check valve 134, on the other hand, is designed so as to open only at a relatively high pressure, that is, at a pressure higher than that which is required to move the rams to fully extended position. A representative value of the fluid pressure required to open the check valve or unloader valve 134 would be 3500 pounds per square inch (p.s.i.), and a representative value of the fluid pressure required to move the piston 20 to end wall 25 of the cylinder and so fully extend the rams as shown to its Fig. 5 position would be 975 p.s.i. The tractor mounted rams 21 and 24 and associated lift connections with the harvester are so proportioned that the critical value of the traction boosting line pressure (975 p.s.i.) at which the rams assume their Fig. 7 position, will effect the maximum weight transfer from the harvester and from the tractor front wheels to the tractor rear wheels, which can be tolerated without jeopardizing proper steering response of the tractor front wheels. In other words, the traction boosting line pressure may exceed the mentioned critical value, but when it reaches it the system functions automatically to prevent further transmission of lifting force and consequent loss of steering response of the tractor and possible upward swinging of the tractor front end about the axis of the tractor rear wheels.

The automatic functioning of the system which limits the amount of weight transfer from the tractor front wheels to the tractor rear wheels will readily be apparent from an inspection of Fig. 7.

In general terms the hitch lever 29, coupling elements 33, 34 and 66 represent articulated hitch means which operatively connect the harvester with the tractor for up and down swinging movement relative thereto about a vertically fixed pivot center at 33; and the hitch lever 29 represents a back and forth movable yieldingly biased draft transmitting element. The hydraulic rams 21 and 24 when considered as a unit represent a servomotor or fluid motor which is mounted on the tractor and operatively connected in lift force transmitting relation with a trail behind implement as represented by the harvester. Actuating means for the fluid motor comprise a source of fluid, as represented by pumps $P_1$ through $P_4$, a main valve which is operatively associated with that source and has a movable fluid control element, as represented by the valve spool 93, such fluid control element being selectively operable to either direct pressure fluid from said source into a manifold, such as the manifold 122, which is connected with the fluid motor, or to emit pressure fluid from said manifold into a sump. Motion transmitting means which include the reach link 37, rockers 146 and 153 and the floating lever 156 are operatively interposed between the back and forth movable draft transmitting element 29 and the main valve for admitting pressure fluid into and emitting pressure fluid from said manifold by operation of the main valve in response to increases and decreases, respectively, of the draft transmitted from the tractor to the harvester or mobile structure. Manually adjustable control means, as represented by the hand lever 169 and associated links 173, 166 and 162, are operable to adjust the fluid control element 93 of the main valve for delivery of pressure fluid from the source $P_1$, $P_2$, $P_3$ and $P_4$ into the manifold 122 and for emission of pressure fluid from said manifold into the sump 101 independently of the back and forth movable draft transmitting element 29.

Figs. 9 and 10 show a modification of the hitch portion of a trail behind implement and tractor shown in Fig. 1; the change being only in the lift force transmitting means operatively connecting the tractor power lift arm to the draft tongue of the trailing implement. The forward portion 271' of this draft tongue has an eye formed in its forward end that is connected to the lever 29 of the tractor hitch mechanism, as heretofore described, and a vertical pivot 241 couples this forward tongue portion to a U-shaped clevis 242 on the rearward tongue portion 38 that is rigid with the implement frame.

The resiliently yieldable structure of the lift force transmitting means is effective to transfer weight from the implement to the rear wheels of the tractor as needed to increase their traction, as heretofore described, in response to variations in draft loading of the trail behind implement. As can be seen in Figs. 9–11, links 282 are positioned substantially normal to the pull bar. This structure comprises at least one coil spring 272 secured relative to the implement tongue between spaced points one of which is fixed and the other movable for placing the spring under either tension or compression upon raising of the power lift arms. As shown, in Figs. 9, 10 and 11 the structure preferably comprises two coil springs 272, 273 disposed longitudinally along opposite sides of tongue portion 271' with the forward ends secured by a pin 274 extending transversely through the tongue and the rearward ends of the springs connected to the depending arms 277 of bell crank levers 276 which are pivotally mounted to an upright 279 on the tongue portion 271'. The other arms 278 of bell crank levers 276 extend horizontally rearward with their ends threaded by a cross rod 281. Lift links 282 are pivotally connected to the ends of cross rod 281 by a clevis 283 having a pin 284 that extends transversely through rod 281 to provide universal pivotal movement between the rod 281 and the link 282. The upper end of each lift link 282 is detachably secured to its power lift arm which is provided by a hitch pin 285 secured in a knuckle piece 284 attached to the end of the lift link. Hitch pins 285 are disposed in jaws 268 of the lift arm socket structure 269.

Fig. 11 shows the hydraulic ram fully extended with its piston 20 against the end wall 25 of the cylinder. The lift arm 18 is then in a fully raised position and the bell crank lever has rotated to place the spring under tension equal to a lift force at or below the critical limit when proper steering response can still be maintained. In this position the arms 278 of the bell crank levers have not moved into alignment with the lift links and a rigid connection between the power lift arms and implement tongue is thereby avoided, so that the system maintains a resilient connection between fully raised power lift arms and the implement tongue without danger of tipping the tractor due to the weight transferred from the implement to the rear wheels of the tractor.

It should be understood that it is not intended to limit the invention to the herein disclosed forms and details of construction and that the invention includes such other forms and modifications as are embraced by the scope of the appended claims.

What is claimed is:

1. In combination: a tractor, an attached draft load imposing structure including a pull bar, a hitch mechanism resiliently interconnecting said tractor and said pull bar for relative movement, a servomotor mounted on said tractor, a power arm pivotally supported by said tractor and moved by said servomotor, resiliently yieldable lift force transmitting means interconnecting said power arm and said pull bar to transfer weight to the drive wheels of the tractor, said resiliently yieldable lift force transmitting means constructed to yield and absorb full movement of said power arm at a predetermined maximum lifting force to prevent said tractor from swinging upward and backward on said drive wheels, and, said hitch mechanism including a control mechanism and means operatively interconnecting said servomotor solely to said control mechanism, said control mechanism operating said servomotor to move said power arm during weight transfer in response to relative movement between said tractor and said attached draft load structure to progressively increase and decrease said lift force upon progressive increase and decrease of said draft load.

2. The combination set forth in claim 1 wherein said resiliently yieldable lift force transmitting means comprises a pair of members slidably engaged longitudinally of one another, and a coil spring having its ends connected to longitudinally spaced portions of said pair of slidably engaged members, said slidably engaged members stretching said spring on extension to oppose the lifting force applied by said servomotor.

3. The combination as set forth in claim 1, wherein said resiliently yieldable lift force transmitting means includes extensible lift linkage connecting said power lift arms to said pull bar, said lift linkage being extensible to take up all of the movement of said ram without transmitting lift force to said pull bar, and resilient means that opposes extension of said lift linkage and absorbs all of the movement of said ram to transfer a predetermined maximum weight from said pull bar to said tractor.

4. The combination set forth in claim 3 in which said extensible lift linkage comprises a lift link connected to said lift arm and a bell crank mounted for pivotal movement on said pull bar with one of its arms connected to said lift link and the other of its arms connected to said resilient means comprising a coil spring mounted on said pull bar.

References Cited in the file of this patent

UNITED STATES PATENTS

| | | |
|---|---|---|
| 1,654,939 | Loebs | Jan. 3, 1928 |
| 2,266,913 | Simmons | Dec. 23, 1941 |
| 2,382,449 | Simmons | Aug. 14, 1945 |
| 2,627,796 | Bunting | Feb. 10, 1953 |
| 2,633,366 | Armington | Mar. 31, 1953 |
| 2,673,092 | Sutherland | Mar. 23, 1954 |
| 2,779,604 | Voegeli | Jan. 29, 1957 |

FOREIGN PATENTS

| | | |
|---|---|---|
| 677,061 | France | Mar. 3, 1930 |
| 487,895 | Great Britain | June 28, 1938 |
| 474,957 | Canada | July 3, 1951 |